United States Patent [19]

Kishi et al.

[11] Patent Number: 5,129,704
[45] Date of Patent: Jul. 14, 1992

[54] AUTOMATIC ADJUSTABLE SEAT

[75] Inventors: Yoichi Kishi; Takayuki Yanagishima, both of Yokosuka City; Hideyuki Nagashima, Yokohama City, all of Japan

[73] Assignee: Nissan Motor Co., Ltd., Yokohama City, Japan

[21] Appl. No.: 633,775

[22] Filed: Dec. 26, 1990

[30] Foreign Application Priority Data

Dec. 28, 1989 [JP] Japan ................... 1-338674

[51] Int. Cl.⁵ ............................................. B60N 2/02
[52] U.S. Cl. ................................. 297/284 R; 297/284 E;
297/284 G; 297/DIG. 3; 297/468
[58] Field of Search ............. 297/284, DIG. 3, 284 R,
297/284 B, 284 C, 284 E, 284 G

[56] References Cited

U.S. PATENT DOCUMENTS 4,655,505  4/1987  Kashiwamura et al. .......... 297/284

FOREIGN PATENT DOCUMENTS 2339069  2/1975  Fed. Rep. of Germany ...... 297/284
61-257333  11/1986  Japan .

*Primary Examiner*—Kenneth J. Dorner
*Assistant Examiner*—Milton Nelson, Jr.
*Attorney, Agent, or Firm*—Leydig, Voit & Mayer

[57] ABSTRACT

A seat comprises a plurality of air mats arranged inside a seat cushion and a seat back. The contour of each of the air mats is automatically varied by a pump and a valve. The fatigue level of a seat occupant is calculated based on a fatigue-indicative parameter weighted in accordance with the running state of a vehicle and the working state of accessories and control gear. The pump and the valves are operated to vary the contour of the air mats when the fatigue level becomes greater than a predetermined value.

14 Claims, 7 Drawing Sheets

AUTOMATIC ADJUSTABLE SEAT

BACKGROUND OF THE INVENTION

The present invention relates to a seat which includes a plurality of portions which can be varied with respect to form and hardness.

Various kinds of seats for a motor vehicle of this type have been proposed in past years. One such seat is disclosed, in JP 61-257333. This seat has a side support portion, a center support portion, and a front support portion which include support members therein. The contour of the seat is variable by expanding and contracting each of the support members. In the event of long driving, each of the support members is controlled at a predetermined cycle by a timer so as to vary the contour of the seat. This variation in contour of the seat results in a periodic change in the posture of a seat occupant, decreasing the fatigue of the seat occupant during driving.

With such a known seat for a motor vehicle, however, since each of the support members is controlled only in a periodic manner, i.e., to vary with a predetermined period of time set by the timer, the contour of the seat may be varied even when the seat occupant is not fatigued, causing the seat occupant discomfort.

Referring to FIG. 6, it can be seen that there is a correlation between the frequency of posture changing motion, i.e., the frequency of physical movement of the seat occupant and the fatigue level of the occupant. It is also understood from FIG. 6 that the higher the frequency of the posture changing motion, the higher the fatigue level.

Further, it is revealed that a body of the seat occupant shows different vital reactions in accordance with the fatigue level of the seat occupant.

SUMMARY OF THE INVENTION

It is, therefore, an object of the present invention to provide a seat having a variable contour which contributes to a decrease in the fatigue of a seat occupant without causing discomfort.

A seat for a vehicle according to the present invention includes a seat cushion and a seat back with a support disposed within the seat cushion or seat back. An actuator is operatively connected to the support. A fatigue detecting means detects fatigue of the seat occumpant and generates a fatigue indicative signal. A microcomputer-based control unit weights the fatigue indicative signal in accordance with the driving condition of the vehicle and calculates a fatigue level of the seat occupant based on the weighted fatigue indicative signal. The actuator is then controlled so as to vary the support in response to the calculated fatigue level.

A seat control method for a vehicle seat according to the present invention comprises detecting a running state of a vehicle and detecting a working state of accessories and control gear of the vehicle. A variable indicative of fatigue of the seat occupant is detetected and a variable indicative signal indicative is weighted in accordance with the running state of the vehicle and the working state of the accessories and control gear, and a fatigue level is calculated based on the weighted signal. An actuator of the seat is then controlled so as to vary a support of the seat in accordance with the fatigue level.

DETAILED DESCRIPTION OF THE INVENTION

Referring to the accompanying drawings, preferred embodiments of a seat for a vehicle according to the present invention will be described.

Figure 1:
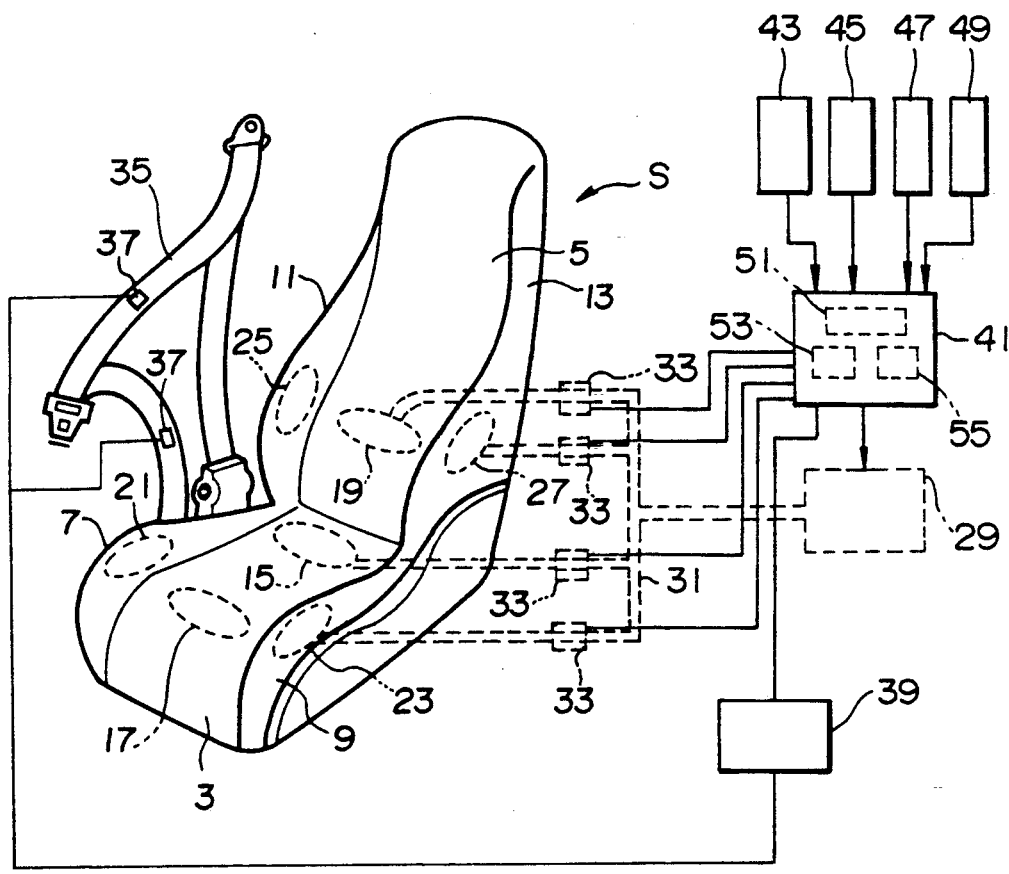
FIG. 1 is a diagrammatic view illustrating a first preferred embodiment of a seat for a vehicle according to the present invention.

Referring to FIG. 1, a seat S for a motor vehicle includes a seat cushion 3 and a seat back 5. The seat cushion 3 includes cushion side support portions 7 and 9 on both side thereof, whereas the seat back 5 includes back side support portions 11 and 13 on both sides thereof.

Inside the seat cushion 3 are arranged, as support means, a buttock support air mat 15 and a thigh support air mat 17 for supporting the seat occupant's buttocks and thigh, respectively, whereas inside the seat back 5 is arranged, as support means, a lumbar support air mat 19 for supporting the seat occupant's lumbar. Additionally, inside the cushion side support portions 7 and 9 are arranged, as support means cushion side support air mats 21 and 23 for supporting the sides at the seat occupant's legs, whereas inside the back side support portions 11 and 13 are arranged, as support means, back side support air mats 25 and 27 for supporting the sides of the seat occupant's arms.

Each of the air mats 15, 17, 19, 21, 23, 25, and 27 is connected with a conduit 31 which branches off from a discharge port of a pump 29. The conduit 31 branches out into four portions, each being provided with a valve 33. The conduit 31, the pump 29, and the valves 33 are elements of an actuator.

The contour of the seat S can be varied by inputting and outputting air to and from each of the air mats 15, 17, 19, 21, 23, 25, and 27 so as to expand and contract them. This variation in contour of the seat S allows the seat occupant to maintain an optimum posture on the seat S at any time during driving.

It is to be noted that the support means may be of the electromagnetic type and/or the vibrator type in place of the aformentioned air mat type.

On a seat belt 35 is arranged, as body displacement detecting means for detecting a physical displacement of a seat occupant induced by a change in his posture on the seat S, an acceleration sensor 37 which provides information, via an integral circuit 39, to a microcomputer 41 as control means.

The acceleration sensor 37, and the integral circuit 39 are arranged for determining a displacement of the seat belt 35 due to physical displacement of the seat occupant.

It is to be noted that a pressure sensor to be arranged inside the seat S, and a television camera may serve as the body displacement detecting means. In the former case, the physical displacement of the seat occupant is determined by the output of the pressure sensor, whereas in the latter case, the physical displacement is detected based on an image picked up by the camera.

The microcomputer 14 receives information from a vehicle speed sensor 43, a longitudinal acceleration sensor 45 and a lateral acceleration sensor 47 for detecting a running state of the vehicle, and a accessories/-controlling gear sensor 49 for detecting the working state of a plurality of accessories such as a glove compartment, an air-conditioner, etc., and a controlling gear including a steering wheel, an emergency flasher, etc. These sensors function as running state detecting means.

The microcomputer 41 includes a memory which stores a predetermined value of teh seat belt displacement amount detected when the occupant sits on the seat S and attaches the seat belt 35, and it determines the physical displacement of the seat occupant by comparing the valve detected by the acceleration sensor 37 with this predetermined value.

The microcomputer 41 includes a weighting operation portion 51 which comprises a weighting means which is an element of a fatigue detecting means. The fatigue detecting means determines that the seat occupant has moved when the value detected by the acceleration sensor 37 is greater than the aforementioned predetermined value, and weights the fatigue of the seat occupant based on a determination whether the physical displacement of the seat occupant is due to fatigue or to other factors such as vehicle behavior. The determination is based on information from the vehicle speed sensor 43, the back/forth acceleration sensor 45, the lateral acceleration sensor 47, and the accessories/control gear sensor 49. Then, the fatigue detecting means calculates the fatigue level F of the seat occupant.

Additionally, the microcomputer 41 includes a counter 53 for detecting the frequency of physical displacement of the seat occupant. If it determines that the seat occupant has moved when the value sensed by acceleration sensor 37 is greater than the aforementioned predetermined value, it iuncrements the counter 53 by one. It also includes a timer 55 for establishing a predetermined period of time.

When a value obtained by simply counting the fatigue level $\hat{F}$ reaches a predetermined value $\bar{F}$, or when it reaches the predetermined value $\bar{F}$ within the predetermined period of time set by the timer 55, the microcomputer 41 outputs signals to control one of the valves 33, thus adjusting air pressure within, for example, the lumbar support air mat 19.

Figure 2A:
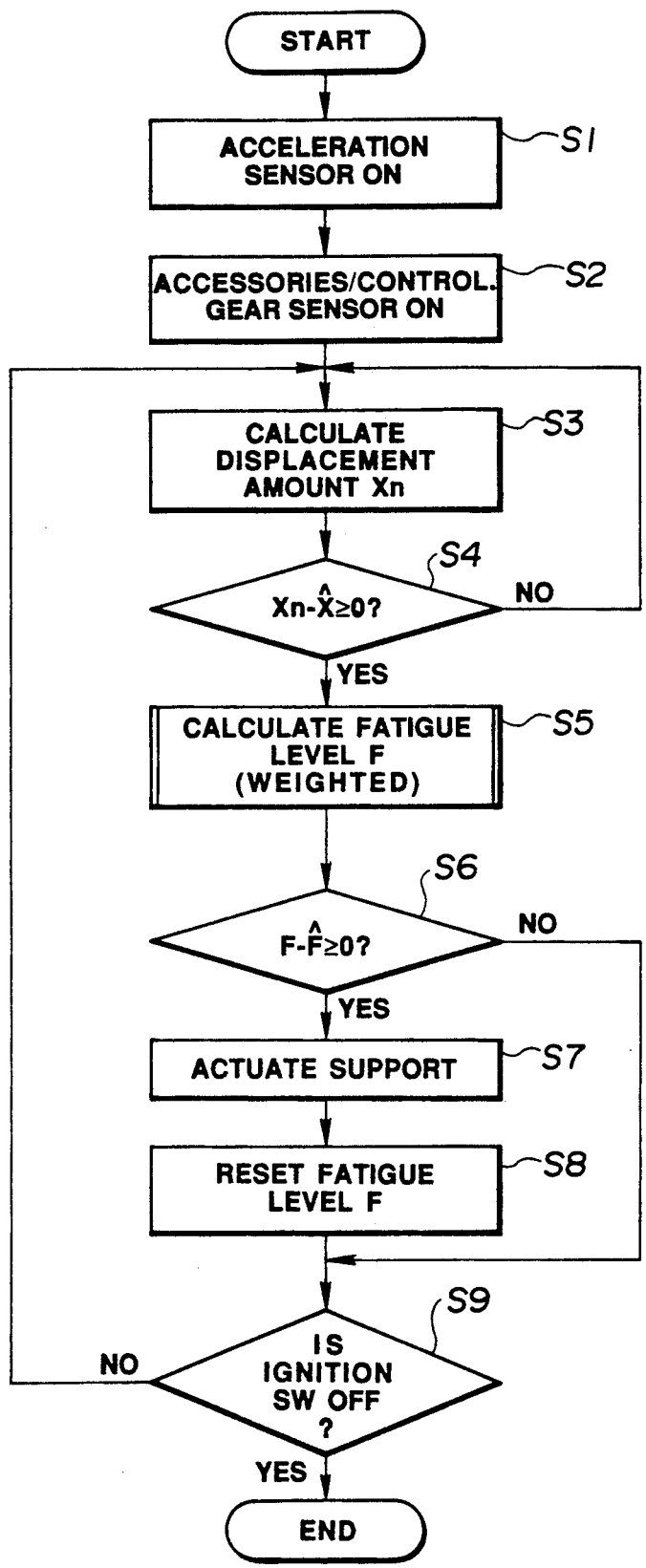
FIG. 2a is a flowchart showing the operation of the first preferred embodiment shown in FIG. 1.
Figure 2B:
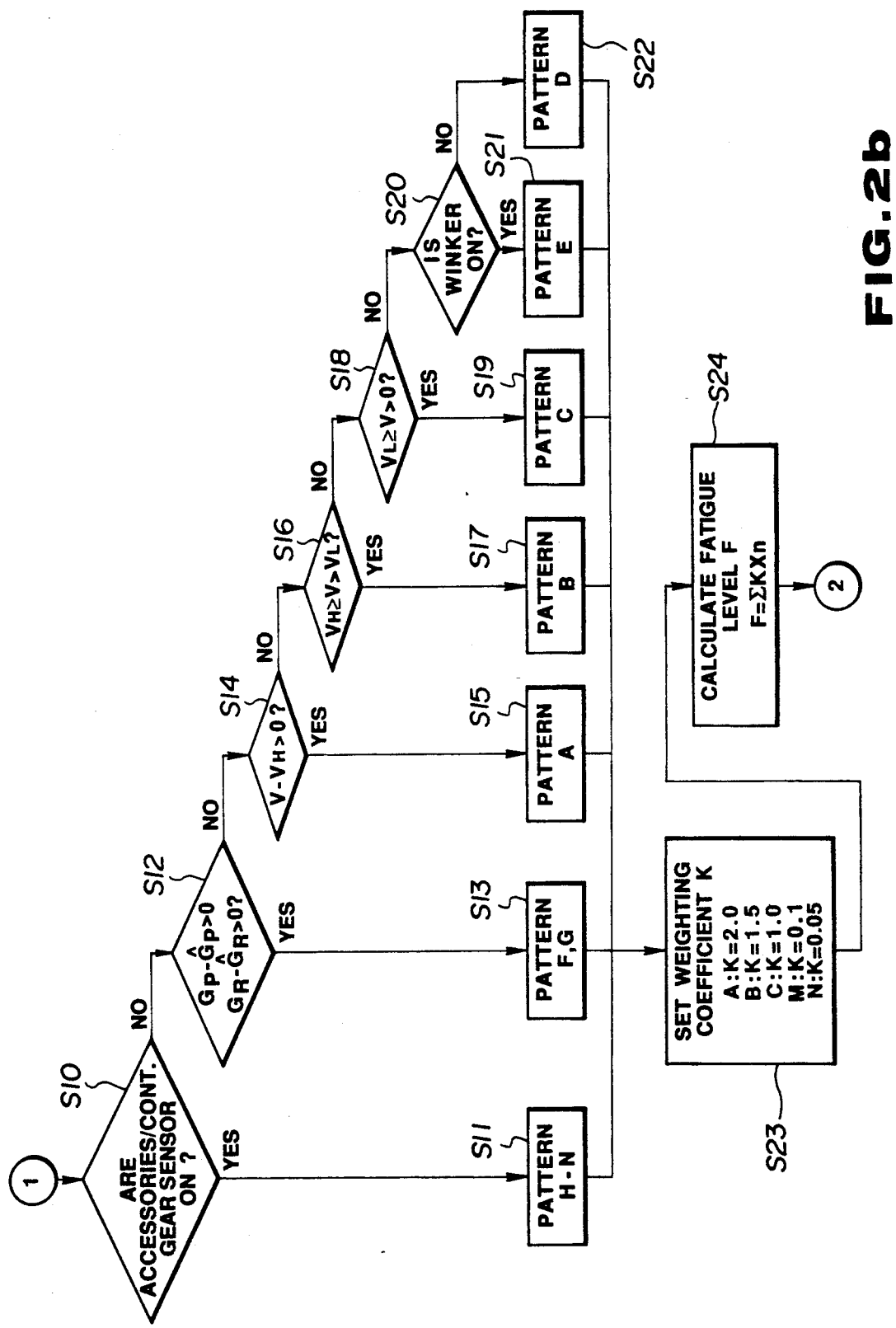
FIG. 2b is another flowchart of the operation of the embodiment of FIG. 1.

Referring to FIGS. 2a and 2b, the operation of a first preferred embodiment will be described. The operations illustrated in these figures start as soon as the occupant, who sits on the seat S and attaches the seat belt 35, turns on the ignition switch, and are repeatedly executed at predetermined intervals of time.

Referring to FIG. 2a, a main routine will be described.

In step S1, the acceleration sensor 37 is turned on. Simultaneously, in step S2, the vehicle speed sensor 43, back/forth acceleration sensor 45, and lateral acceleration sensor 47, and the accessories/control gear sensor 49 are turned on.

In step S3, the value detected by the acceleration sensor 37 is converted into a displacement $X_n$ of the seat belt 35 by the integral circuit 39 then read by the microcomputer 41. The values detected by the vehicle speed sensor 43, back/forth acceleration sensor 45, and lateral acceleration sensor 47, and the accessories/control gear sensor 49 are also read by the microcomputer 41.

In step S4, it is determined whether or not the displacement $S_n$ of the seat belt 35 is greater than a predetermined value $\bar{X}$. The seat belt 35 is pulled out when the seat occupant moves his arm forward, for example. Accordingly, it is possible to determine that the seat occupant has moved when a change in the seat belt displacement $X_n$ is greater than the predetermined value $\bar{X}$. In that manner, the fatigue level F can be evaluated by a movement of the occupant's arm. If the answer to the inquiry in step S4 is YES, the routine proceeds to step S5 where the weighted fatigue level F is calculated.

Figure 4A:
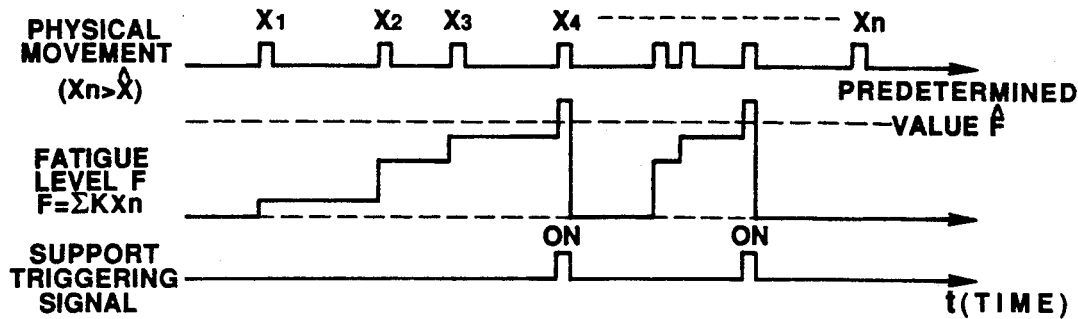
FIGS. 4a-4c are time charts of the operation of a support means for use in the present invention.

IN step S6, it is determined whether or not this calculated value of fatigue level F is greater than the aforementioned predetermined value F. Referring to FIG. 4a, if the calculated fatigue level F exceeds the predetermined value F, it is determined that the seat occupant has become highly fatigued, and the routine proceeds to step S7.

Referring also to FIG. 4a, in step S7, the micorcomputer 41 outputs triggering signal to repeatedly perform air supply and discharge within, for example, the lumbar support air mat 19 a predetermined number of times. This casues expandsion and contraction of the lumbar support portion of the seat S in a repeated manner, resulting in a decrease in fatigue of the seat occupant due to physiological activation of his spinal column. In order to obtain similar results, the lumbar support portion of the seat S may be shaken up and down by a motor or vibrated by a vibrator during a predetermined period of time.

In step S8, the fatigue level F is reset to zero, and the routine proceeds to step S9 where it is determined whether the ignition switch is turned off or not. Similarly, if it is determined in step S6 that the calculated value of the fatigue level F fails to exceed the predetermined value F, the routine proceeds to step S9.

In step S9, if the ignition switch is ON, the vehicle is running or may run again even if it is at a standstill at that time, so the routine returns to the step S3 so as to continuously execute control. On the other hand, if the ignition switch if OFF, the routine comes to an end.

As described above, since the contour of the seat S is varied in response to the fatigue level F which is directly detected, a decrease in fatigue of the seat occupant is possible without discomfort.

Figure 3:
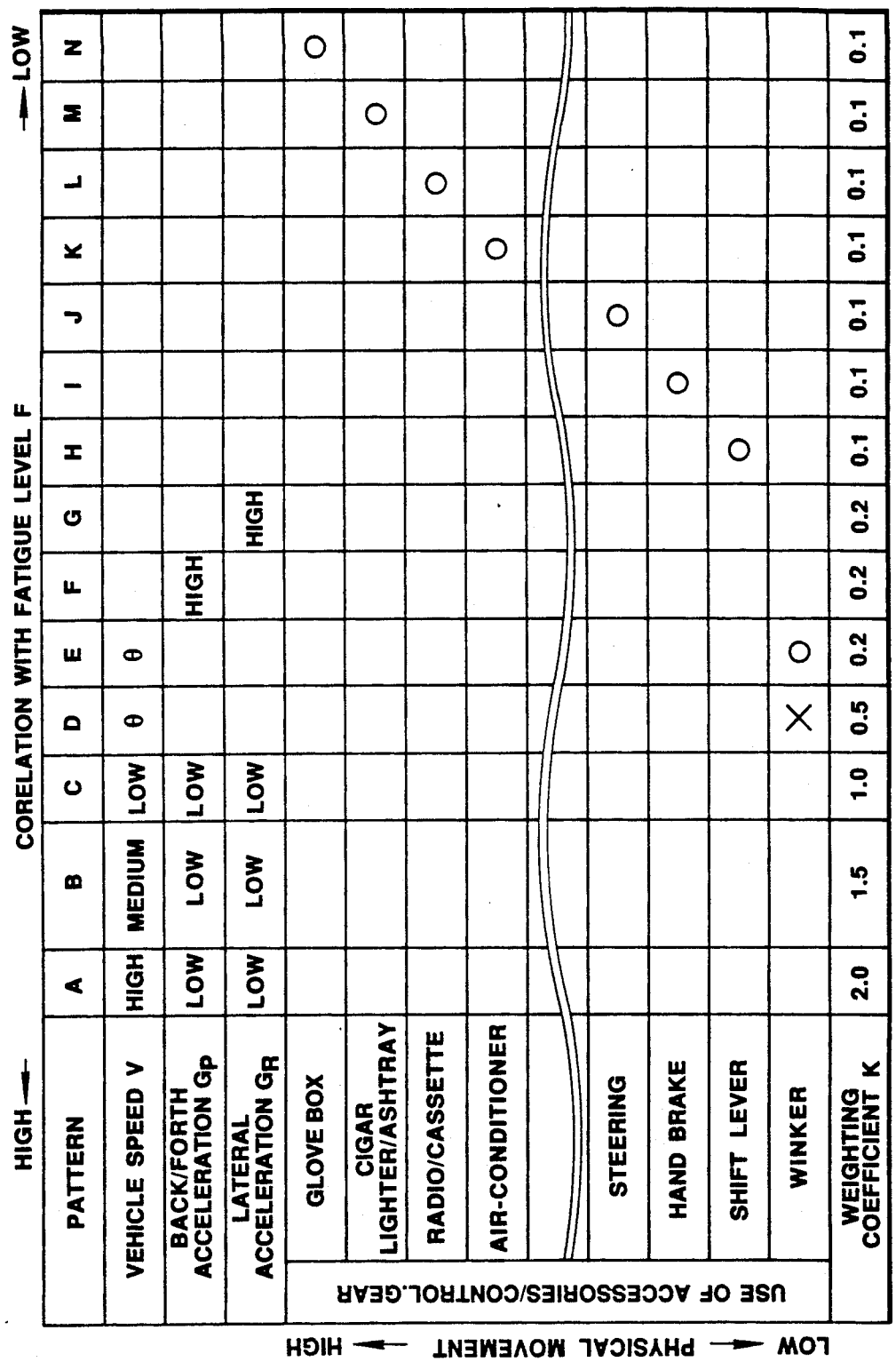
FIG. 3 is a table showing an example of weighting according to different driving patterns.

It is to be noted that in step S5, weighting of the fatigue level F is performed to determine whether the physical movement of the seat occupant is due to fatigue or other factors. Referring to FIG. 3, in this embodiment, the driving pattern is subdivided into patterns A-N in accordance with the correlation between the running state of the vehicle and the working state of the accessories and control gear, each pattern having a corresponding weighting coefficient k. By way of example, in pattern A, no accessory or control gear is actuated, and the vehicle travels at high speed with low back/forth acceleration $G_P$ and low lateral acceleration $G_R$. In that event, since driving continues monotonously, it is determined that most of the physical movement of the seat occupant results from fatigue, so the weight coefficient k is set to 2.0. On the other hand, in each of patterns H-N, since the occupant moves to actuate one of the accessories or control gear, it is determined that, in most cases, the physical movement of the seat occupant does not result from fatigue, so the weighting coefficient k is set to 0.1. In this manner, the weighting coefficient k is variable from 2.0 to 0.1 in accordance with patterns A-N as indicated in FIG. 3.

Referring to FIG. 2b, a subroutine will be described.

In a step S10, it is determined whether or not detection signal is inputted from the accessories/control gear sensor 49, i.e., whether the sensor 49 is turned on. If there is a detection signal, the subroutine proceeds to step 11 where it is determined that driving takes place in one of patterns H-N. On the other hand, if there is no detection signal, the subroutine proceeds from step S10 to step S12.

In step S12, it is determined whether or not the value $G_P$ of back/forth acceleration detected by the back/forth acceleration sensor 45 and the vaule $G_R$ of the lateral acceleration cetected by the lateral acceleration sensor 47 are greater than predetermined values $G_p$ and $G_R$, respectively. If $G_p$ is greater than the predetermined value $G_P$ or $G_R$ is greater than the predetermined value $G_r$, it is determined that driving takes place in one of patterns F and G.

In step S12, if $G_p$ is equal to or smaller than the pedetermined value $G_P$ or $G_R$ is equal to or smaller than the predetermined value $G_R$, the subroutine proceeds to step S14 where it is determined whether or not the value V of the vehicle speed detected by the vehicle, speed sensor 43 is greater than a predetermined upper limit $V_H$ (80 km/h, fore example), i.e. whether the vehicle is travelling at a high speed. If the detection value V is greater than the predetermined value $V_H$, i.e., if the vehicle travels at high speed, the subroutine proceeds to step S15 where it is determined that the driving takes place in pattern A.

In step S14, if V is equal to or smaller than the predetermined value $V_H$, i.e., if the vehicle fails to travel at a high speed, the subroutine proceeds to step S16 where it is determined whether or not V is between the aforementioned upper limit $V_h$ and a predetermined lower limit $V_L$ (30 km/h, for example), i.e., the vehicle travelling at medium speed. If $V_H \geq V > V_L$, i.e., if the vehicle travels at medium speed, the subroutine proceeds to step S17 where it is determined that the driving takes place in pattern B.

In step S16, if V is equal to or smaller than the predetermined lower limit $V_L$, i.e., if the vehicle fails to travel at medium speed, the subroutine proceeds to step S18 where it is determined whether or not V is between the predetermined lower limit $V_L$ and zero, i.e., if the vehicle travelling at low speed. If $V_L > V > 0$, i.e., the vehicle travels at low speed, the subroutine proceeds to step S19 where it is determined that the driving takes place in pattern C.

In step S18, if V is equal to zero, i.e., if the vehicle is at standstill, the subroutine proceeds to step S20 where it is determined whether emergency flasher is turned on or not. In the event emergency flasher is ON, there is a high probability that the seat occupant moved for reasons of safety. Thus the subroutine proceeds to step S21 where it is determined that driving takes place in pattern E. On the other hand, in the event the emergency flasher is OFF state, the seat occupant will seldom have moved for resons of safety, so the subroutine proceeds from step S20 to step S22 where it is determined that driving takes place in pattern D.

In step S23, a value of the weighting coefficient k is established for each of the patterns A-N which is determined in step S5 or S10. By way of example, the weighting coefficient k is set to 2.0 for pattern A and to 1.5 for pattern B. Then, in step S24, the value of the fatigue level F is calculated using the weighting coefficient k. In this embodiment, calculatin of the fatigue level F is performed based on the following expression:

$$F = \Sigma\, kS_n.$$

As described abvove, since the fatigue level F of the seat occupant is calculated after weighting the fatigue by taking into account conditions related to the occurrences of physical displacement, a more precise value of the fatigue level F is obtained.

It is to be noted that good results can be obtained even if weighting is performed on only a portion of patterns A-N.

Figure 5:
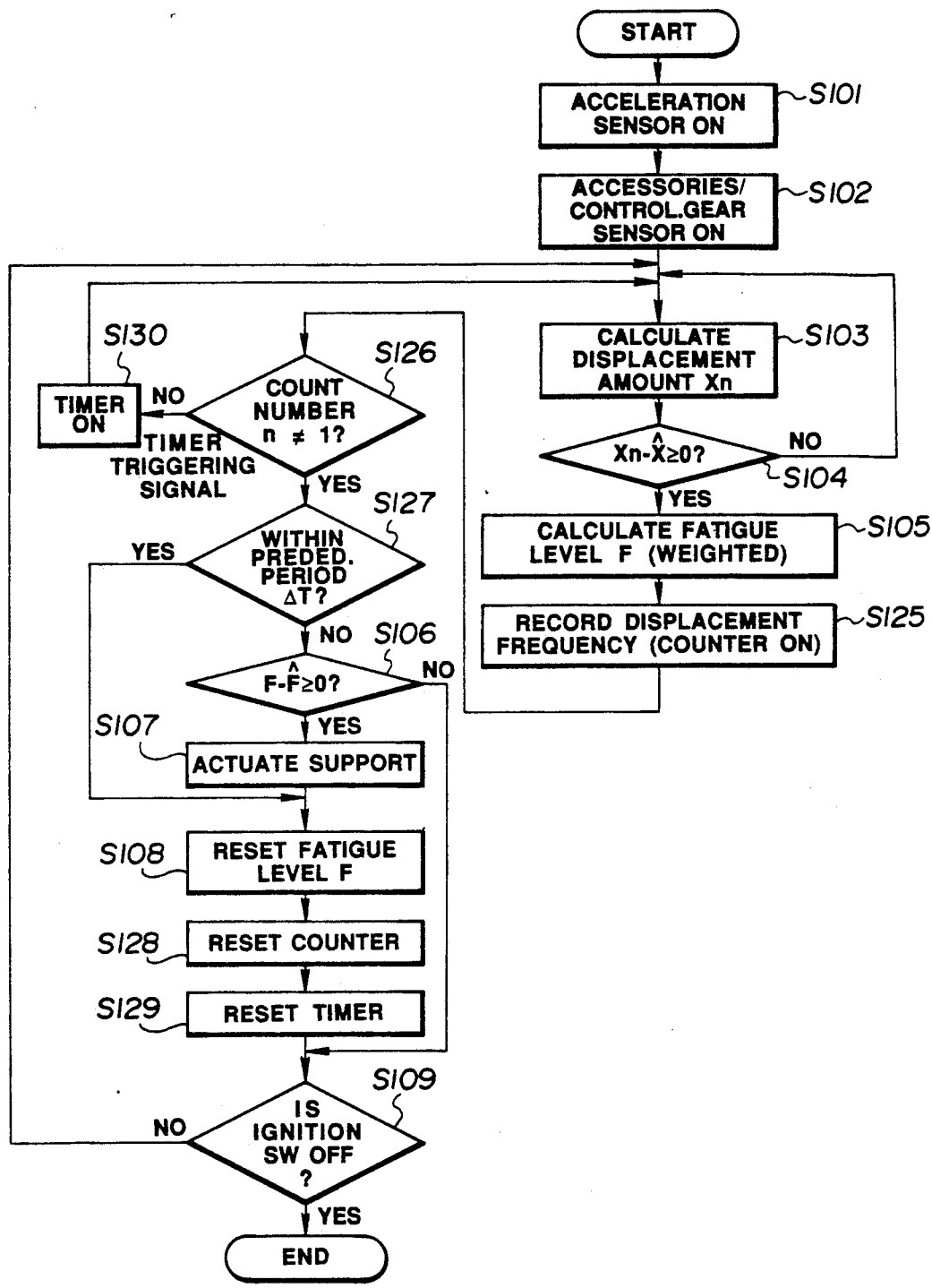
FIG. 5 is a flowchart of the operation of a second preferred embodiment.
Figure 6:
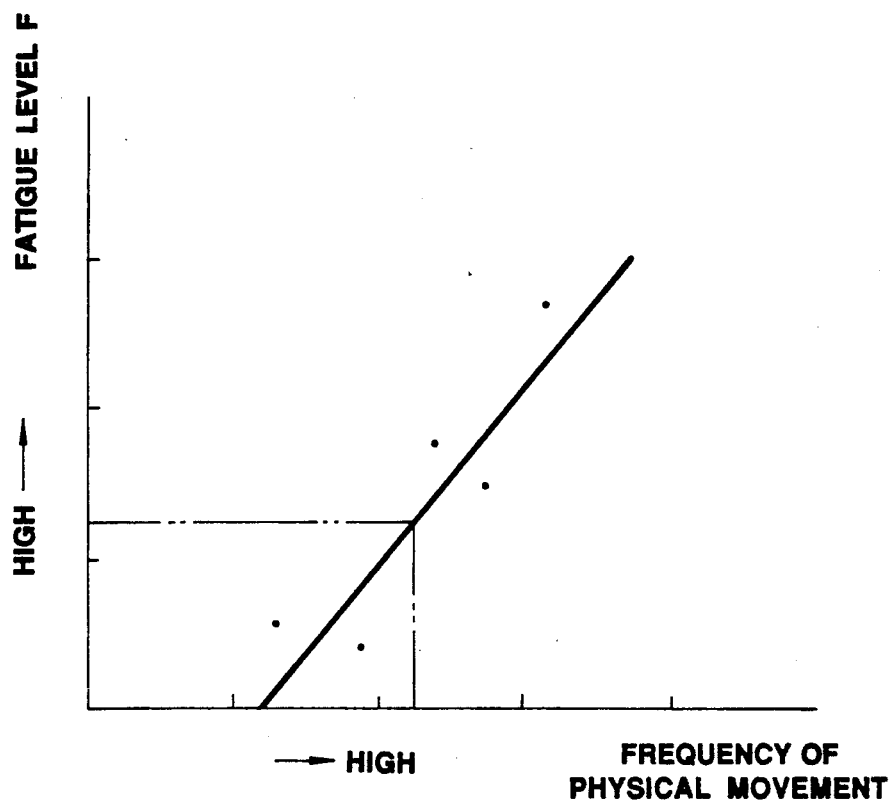
FIG. 6 is a graph showing the correlation between physical movement of a seat occupant and a fatigue level.

Reffering to FIG. 5, the operation of a second preferred embodiment will be described.

In this embodiment, steps S101-S109 correspond to steps S1-S9 of the first preferred embodiment as shown in FIG. 2a, and steps S125-S130 are newly added thereto.

Figure 4B:
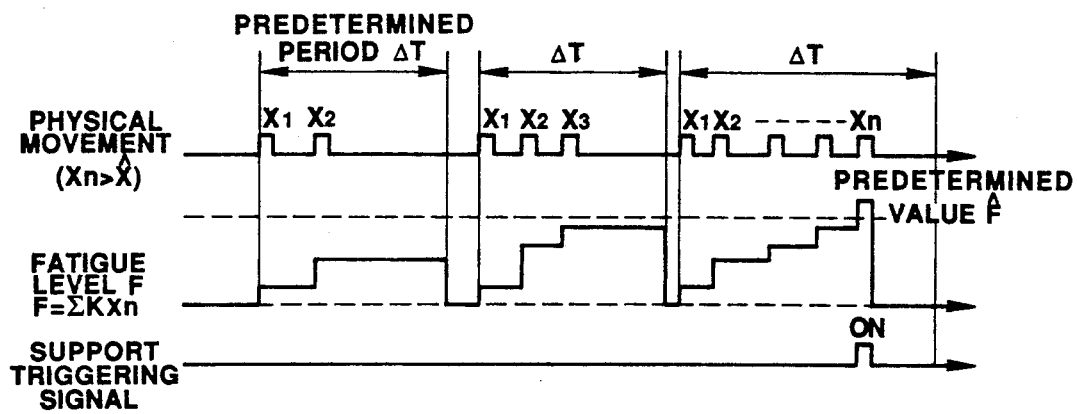

In step S125, the counter 53 arranged for detecting the frequency n of physical displacement of the seat occupant is turned on. In subsequent step S126, if the count number is 1, ei.e., if counting has just started, the routine proceeds to step S130 where the microcomputer 41 outputs a triggering signal to turn on the timer 55. Referring to FIG. 4b, in steps S127 and S106, if a calculated value of the fatigue level F exceeds the predetermined value F within a predetermined period of time $\Delta T$, it is determined that the seat occupant has become highly fatigued. In subsequent sep S107, the microcomputer 41 outputs a triggering signal to start the lumbar support air mat 19, for example, thus executing the same control as described in connection with the first preferred embodiment. Then, the fatigue level F is reset to zero in step S108, and the counter 53 and the timer 55 are also reset to zero in steps S128 and S129.

As described above, since the timer 55 starts to function from when the seat occupant feels fatigued, not only the fatigue detecting accuracy is improved, but the timer 55 is free from needless operation.

Figure 4C:
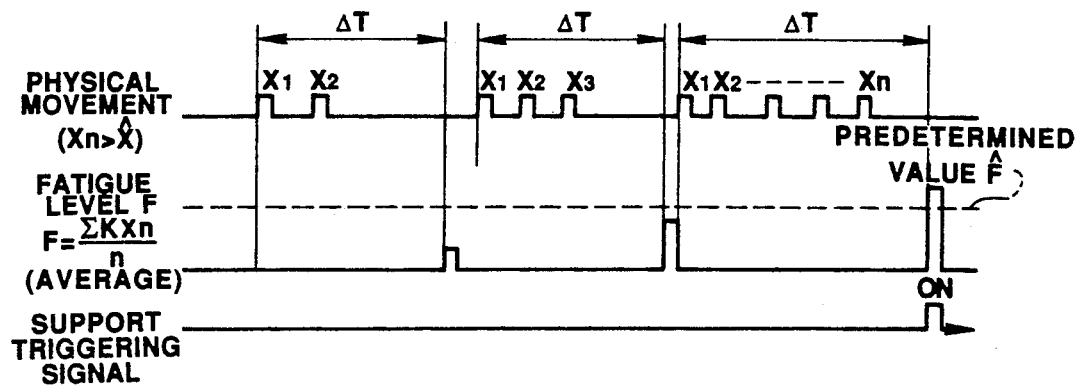

In each of the aforementioned embodiments, as shown in FIGS. 4a and 4b, the calculated value of the fatigue level F is a sum $\Sigma\, k\, S_n$ which is obtained by simply, summing $k\, X_n$, which is the product of the weighting coefficient k and the displacement amount $X_n$, and when the sum $\Sigma\, k\, X_n$ exceeds the predetermined value F, the microcomputer 41 outputs a triggering signal to start the lumbar air mat 19, for example. Alternatively, as shown in FIG. 4c, the calculated value of the fatigue level F may be an average which is obtained by dividing the sum $\Sigma\, k\, X_n$ by the frequency n of physical displacement. When this average exceeds the predetermined level F within the predetermined period of time $\Delta T$ (delta T), the microcomputer 41 may output a triggering signal to start the air mat 19.

Further, in each of the aforementioned embodiments, the case is described in which the lumbar support air mat 19 is operated to decrease the fatigue of the seat occupant. Alternatively, air mats in other portions of the seat S such as in a seat side portion, a buttock support portion, or a thigh support portion may be operated in a similar manner.

Furthermore, in each of the aforementioned embodiments, the control of variation of the seat contour starts as soon as the ignition switch is turned on. Alternatively, since the physical movement of the seat occupant is relatively frequent during a certain period of time just after th start of driving, and during this period physical movement has no immediate relation to fatigue, control may start after a lapse of a predetermined period of time from the start of driving, i.e. from a predetermined period of time after the ignition is turned on or the seat occupant sits down..

It is to be noted that the seat S of the present invention is not limited to the motor vehicle, but is also applicable to other vehicles.

What is claimed is:

1. A seat for a seat occupant in a vehicle comprising:
   a seat cushion;
   a seat back extending from said seat cushion;
   a support disposed within said seat cushion or said seat back;
   an actuator operatively connected to said supports;
   means for detecting fatigue of the seat occupant and generating a fatigue indicative signal indicative of said detected fatigue;
   means for detecting a driving condition of the vehicle and generating a driving condition indicative signal indicative of said driving condition; and
   a microcomputer-based control unit operatively connected to said actuator and comprising:
   means for weighting said fatigue indicative signal in accordance with said driving condition indicative signal;
   means for calculating a fatigue level of the seat occupant based on the weighted fatigue indicative signal and generating a fatigue level indicative signal indicative of said calculated fatigue level; and
   means for controlling said actuator to cause said support to vary in response to said fatigue level indicative signal.

2. A seat as claimed in claim 1 wherein said support comprises an air mat.

3. A seat as claimed in claim 1, wherein said support comprises a lumbar support so constructed and arranged in said seat back as to support the occupant's lumbar.

4. A seat as claimed in claim 1, wherein said support comprises a buttock support so constructed and arranged in said seat cushion as to support the occupant's buttocks.

5. A seat as claimed in claim 1, wherein said support comprises a thigh support so constructed and arranged in said seat cushion as to support the occupant's thigh.

6. A seat as claimed in claim 1, wherein said support comprises cushion side supports so constructed and arranged in said seat cushion as to support a leg of the occupant.

7. A seat as claimed in claim 1, wherein said support comprises a back side support so constructed and arranged in said seat back as to support an arm of the occupant.

8. A seat as claimed in claim 1 wherein said actuator includes a pump, conduit means for establishing fluid communication between said pump and said support, and valve means disposed in said conduit means for controlling supply of air to and discharge of air from said support.

9. A seat as claimed in claim 1 wherein said fatigue detecting means comprises an acceleration sensor disposed so as to sense movement of the occupant's body.

10. A seat as claimed in claim 1, wherein said driving condition detecting means comprises a vehicle speed sensor, a longitudinal acceleration sensor, a lateral acceleration sensor, and an accessories/control gear sensor.

11. A seat as claimed in claim 1 wherein said control unit includes a timer and a counter.

12. A seat for a seat occupant in a vehicle, the vehicle including a plurality of accessories and a control gear, comprising:
    a seat cushion;
    a seat back extending from said seat cushion;
    a support disposed within said seat cushion or said seat back;
    an actuator operatively connected to said support;
    first sensor means for detecting a running state of the vehicle and generating a running state indicative signal indicative of said running state;
    second sensor means for detecting a working state of the plurality of accessories and the control gear and generating a working state indicative signal indicative of said working state;
    means for dectecting a predetermined variable indicative of fatigue of the seat occupant and generating a predetermined variable indicative signal indicative of said predetermined variable; and
    a microcomputer-based control unit operatively connected to said actuator, said first and second sensor means, and said predetermined variable detecting means,
    said control unit comprising:
    means for weighting said predetermined variable indicative signal in accordance with said running state indicative signal and said working state indicative signal and generating a weighting indicative signal indicative of said weighted predetermined variable indicative signal;
    means for calculating a fatigue level of the seat occupant based on said weighting indicative signal and generating a fatigue level indicative signal indicative of said calculated fatigue level; and
    means for controlling said actuator in such a manner as to cause said support to vary in response to said fatigue level indicative signal.

13. A seat for a vehicle, the vehicle including a plurality of accessories and a control gear, comprising:
    a seat cushion;
    a seat back extending from said seat cushion;
    a seat belt system operatively associated with said seat cushion and said seat back to secure the seat occupant with respect to said seat cushion and said seat back;
    a support disposed within said seat cushion or said seat back;
    an actuator operatively connected to said support;
    first sensor means for detecting a running state of the vehicle and generating a running state indicative signal indicative of said running state;
    second sensor means for detecting a working state of the plurality of accessories and the control gear and generating a working state indicative signal indicative of said working state; displacement detecting means for detecting a displacement of a portion of the seat belt system and generating a seat belt displacement indicative of said displacement; and a microcomputer-based control unit operatively connected to said actuator, said first and second sensor means, and said displacement detecting means, said control unit comprising:

means for weighting said seat belt displacement indicative signal in accordance with said running state indicative signal and said working state indicative signal and generating a weighting indicative signal indicative of said weighted seat belt displacement indicative signal;

means for calculating a fatigue level of the seat occupant based on said weighting indicative signal and generating a fatigue level indicative signal indicative of said calculated fatigue level; and means for controlling said actuator in such a manner as to cause said support to vary in response to said fatigue level indicative signal.

14. A method of controlling an actuator operatively connected to a support within a seat for a seat occupant in a vehicle, the vehicle including a plurality of accessories and a control gear, the method comprising:

detecting a running state of the vehicle and generating a running state indicative signal indicative of said running state;

detecting a working state of the plurality of accessories and the control gear and generating a working state indicative signal indicative of said working state;

detecting a predetermined variable indicative of fatigue of the seat occupant and generating a predetermined variable indicative signal indicative of said predetermined variable;

weighting said predetermined variable indicative signal in accordance with said running state indicative signal and said working state indicative signal and generating a weighting indicative signal indicative of said weighted predetermined variable indicative signal;

calculating a fatigue level of the seat occupant based on said weighting indicative signal and generating a fatigue level indicative signal indicative of said calculated fatigue level; and controlling said actuator in such a manner as to cause said support to vary in response to said fatigue level indicative signal.

* * * * *